(12) United States Patent
Stone et al.

(10) Patent No.: US 7,637,829 B2
(45) Date of Patent: Dec. 29, 2009

(54) ECCENTRIC PIVOT ARM TENSIONER

(75) Inventors: Roger Derrick Stone, Tervuren (BE); Jerry Booen, Wymondham (BE); Ian Doble, Barford (GB); Gordon Charles Hensley, Dusseldorf (DE); Hans Peter Kutzer, Gangelt (DE); Jim Router, Wymondham (GB); Klaus Conno Steffens, Herzogenrath (DE)

(73) Assignee: The Gates Corporation, Denver, CO (US)

( * ) Notice: Subject to any disclaimer, the term of this patent is extended or adjusted under 35 U.S.C. 154(b) by 749 days.

(21) Appl. No.: 10/953,910

(22) Filed: Sep. 29, 2004

(65) Prior Publication Data

US 2006/0068957 A1 Mar. 30, 2006

(51) Int. Cl.
*F12H 7/10* (2006.01)

(52) U.S. Cl. .................. 474/112; 474/109; 474/135; 474/117

(58) Field of Classification Search .......... 474/109, 474/111, 112, 136, 166, 165, 110, 135, 117, 474/133, 139; 411/110, 111
See application file for complete search history.

(56) References Cited

U.S. PATENT DOCUMENTS

| | | | | |
|---|---|---|---|---|
| 4,504,252 A | | 3/1985 | Honma | 474/112 |
| 4,618,335 A | | 10/1986 | Brandenstein et al. | 474/112 |
| 4,808,148 A | * | 2/1989 | Holtz | 474/112 |
| 4,832,665 A | * | 5/1989 | Kadota et al. | 474/112 |
| 4,834,694 A | | 5/1989 | Martin | 474/135 |
| 4,904,230 A | * | 2/1990 | Kawashima et al. | 474/112 |
| 4,906,222 A | | 3/1990 | Henderson | 474/135 |
| 4,917,655 A | | 4/1990 | Martin | 474/112 |
| 4,934,987 A | | 6/1990 | Kadota et al. | 474/112 |

(Continued)

FOREIGN PATENT DOCUMENTS

WO  WO 99/47833  9/1999

*Primary Examiner*—Robert A Siconolfi
*Assistant Examiner*—Thomas W Irvin
(74) *Attorney, Agent, or Firm*—J. A. Thurnau, Esq.; J. L. Mahurin, Esq.; P. N. Dunlap, Esq.

(57) ABSTRACT

An eccentric pivot arm tensioner capable of automatic belt tensioning and substantially simultaneous operating range indexing during installation. The tensioner comprises a stop plate and cooperating lock plate. The tensioner comprises a pivot arm having a pivot arm member that cooperatively engages a base plate member. In a first, or transit mode, the pivot arm member temporarily engages the base plate member to put a torsion spring and thereby the pivot arm in a preloaded condition. The lock plate is engaged with the stop plate. As a mounting fastener is engaged into a mounting surface the pivot arm member is automatically disengaged from the base plate member by an axial movement of the pivot arm, thereby allowing the pivot arm to rotate and thereby impart a torsion spring force to a belt, i.e., tensioning the belt in an operating position. During the initial movement the lock plate remains engaged with the stop plate thereby causing the lock plate to rotate with the pivot arm, which automatically and properly indexes the pivot arm movement travel stop members with respect to the lock plate, thereby automatically setting a working range. As the fastener is then fully torqued down, the lock plate is fully disengaged from the pivot arm and yet fixed in position to allow full operation of the pivot arm in the operating range.

5 Claims, 8 Drawing Sheets

U.S. PATENT DOCUMENTS

| | | | | |
|---|---|---|---|---|
| 5,030,171 A | * | 7/1991 | Henderson | 474/135 |
| 5,207,620 A | * | 5/1993 | Yamamoto et al. | 474/135 |
| 5,244,438 A | * | 9/1993 | Golovatai-Schmidt | 474/112 |
| 5,266,067 A | * | 11/1993 | Gapco | 474/112 |
| 5,370,586 A | * | 12/1994 | Thomsen et al. | 474/135 |
| 5,453,057 A | * | 9/1995 | Gardner et al. | 474/135 |
| 5,575,727 A | | 11/1996 | Gardner et al. | 474/135 |
| 5,919,107 A | * | 7/1999 | Stepniak | 474/112 |
| 6,001,037 A | | 12/1999 | Rocca et al. | 474/112 |
| 6,149,542 A | * | 11/2000 | Lehtovaara | 474/112 |
| 6,416,435 B1 | | 7/2002 | Szatkowski et al. | 474/112 |
| 6,855,079 B2 | * | 2/2005 | Cura et al. | 474/135 |
| 2002/0119850 A1 | * | 8/2002 | Dutil | 474/135 |
| 2003/0017893 A1 | * | 1/2003 | Kaido et al. | 474/101 |
| 2003/0078124 A1 | * | 4/2003 | Serkh | 474/135 |
| 2003/0125142 A1 | * | 7/2003 | Hashimoto et al. | 474/109 |
| 2004/0180745 A1 | * | 9/2004 | Dinca et al. | 474/135 |
| 2005/0049093 A1 | * | 3/2005 | Sato et al. | 474/101 |
| 2006/0217222 A1 | * | 9/2006 | Lolli et al. | 474/134 |
| 2008/0153642 A1 | * | 6/2008 | Baumuller et al. | 474/101 |

* cited by examiner

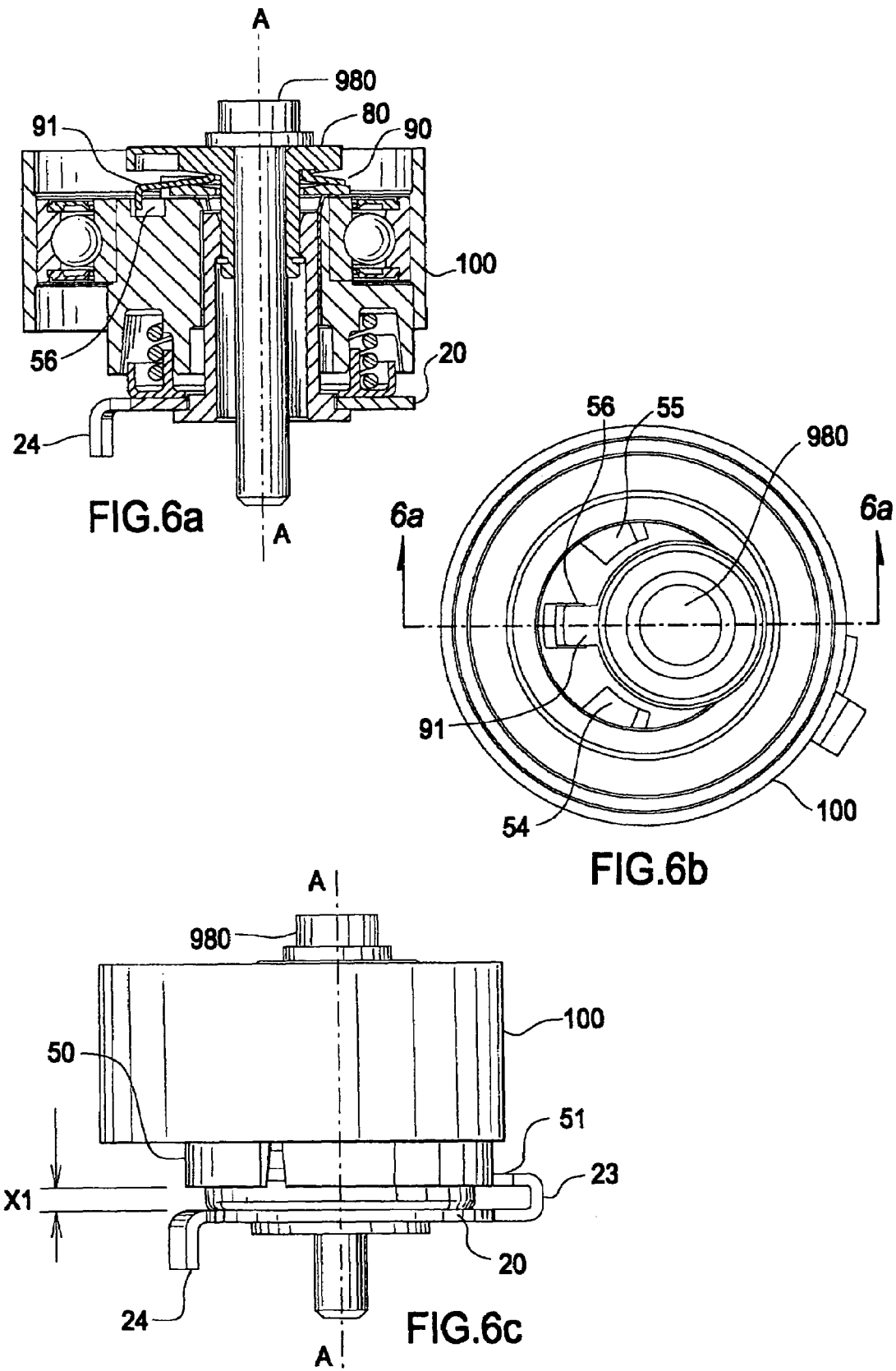

ECCENTRIC PIVOT ARM TENSIONER

FIELD OF THE INVENTION

The invention relates to eccentric pivot arm tensioners and more particularly, to an eccentric pivot arm tensioner having cooperating members for automatic release of a preloaded pivot arm and substantially simultaneous automatic adjustment of pivot arm travel range limits during installation.

BACKGROUND OF THE INVENTION

Eccentric tensioners may be categorized as single eccentric, one pivot arm, or double eccentric, two pivot arms, each having bores and bearing surfaces. The center of rotation of the bore(s) is eccentrically displaced from the center of rotation of the bearing. This eccentric displacement, coupled with a spring force, imparts a moment which can be translated in to a force to allow tensioning of a drive belt.

The design principle for a double eccentric tensioner is for one pivot arm, the adjustor pivot arm, to be such that it is able to compensate for build tolerances. This pivot arm is locked in position as part of the installation procedure. The second pivot arm, the working pivot arm, controls the belt tension. This pivot arm is free to move, within limits, during operation. The limits are set to avoid conditions which could be detrimental to the drive system or any component within the drive system.

The combined length of these pivot arms is dependant on the geometry of the drive, the tolerance stack up, the wrap angle, the drive dynamics and the tension at which the drive is required to operate.

The tensioner baseplate need also be at a known orientation to the drive belt. This is normally achieved by means of incorporation of a tang in the baseplate design which then cooperatively locates in a recess in a predetermined position on the engine block. This can also be achieved by other means as well known in the art.

Prior to installation, there is normally no need to preload the spring on this type of tensioner With respect to the single eccentric tensioner, it comprises only one pivot arm, the working pivot arm, which compensates for build tolerances and controls the belt tension within the required specification. The pivot arm is free to pivot, within travel limits, during normal operating conditions. The travel limits are predetermined to avoid conditions which could be detrimental to the drive system or any component within the drive system.

The length of the pivot arm is dependant on the geometry of the drive, the tolerance stack up, the wrap angle, the drive dynamics and the tension at which the drive is required to operate.

This type of tensioner may or may not include the need for the tensioner baseplate to be at a known orientation to the drive belt. If required it can be achieved in the same manner as for the double eccentric tensioner.

Prior to installation on an engine, the spring for the single eccentric tensioner is "preloaded" and a load pin, or other similar device, temporarily holds the tensioner body in a predetermined position relative to the baseplate. The position is calculated to give sufficient clearance from the belt to allow the tensioner to be mounted on the engine during the tensioner/drive installation procedure. The tensioner spring is under compression in this condition. Removal of this load pin, or other such device, during installation, releases the spring thereby tensioning the belt.

For both types of tensioners a typical installation procedure requires the engine crankshaft to be set at a predetermined rotational angle. The camshaft(s) are also set and locked by some means at a known relative angle to the crankshaft. These angles are defined by the engine designer.

The belt drive system can then be mounted on the engine. Components which require to be timed relative to the crankshaft should be locked in the "timed" position at this point.

For a double eccentric tensioner, the tensioner is then mounted in the desired orientation. The fixing bolt is inserted through the tensioner to the engine mounting point and semi tightened. The tensioner is then rotated, initially using the adjustor pivot arm to take up slack in the drive, and then using the working pivot arm to tension the belt. The fixing bolt is then tightened thereby locking the adjuster pivot arm.

The tensioner travel limits are pre-positioned relative to the baseplate. The operating position is determined by means of a pointer on the pivot arm which rotates to a reference set point during installation, thereby indicating that the correct tension level has been achieved.

For a prior art single eccentric tensioner, if required, the tensioner is mounted in the correct orientation. The fixing bolt is inserted through the tensioner in to the engine fixing point and tightened. The load pin, or other such device, is then released thereby simultaneously taking up slack in the drive and achieving the correct belt tension level.

The tensioner design may permit the tensioner travel limits to be correctly positioned during the tensioning process by some mechanical means or some other manual adjustment may be necessary to achieve this.

All pulleys are then fully tightened. For a double eccentric tensioner belt drive system, the engine is rotated through 360 degrees, or a multiple thereof, and the tensioner pivot arm pointer position then rechecked.

Representative of the art is U.S. Pat. No. 4,832,665 to Kadota (1989) which discloses a tensioner comprising a moveable eccentric member rotatably provided about a fixed member. A spring is provided between the stationary portion and the moveable eccentric member for biasing the eccentric member in a direction to press an idler into contact with a driving member.

What is needed is an eccentric pivot arm tensioner having cooperating members for automatic release of a preloaded pivot arm torsion spring and substantially simultaneous automatic adjustment of pivot arm travel range limits during installation. The present invention meets this need.

SUMMARY OF THE INVENTION

The primary aspect of the invention is to provide an eccentric pivot arm tensioner having cooperating members for automatic release of a preloaded pivot arm torsion spring and substantially simultaneous automatic adjustment of pivot arm travel range limits during installation.

Other aspects of the invention will be pointed out or made obvious by the following description of the invention and the accompanying drawings.

The invention comprises an eccentric pivot arm tensioner capable of automatic belt tensioning and substantially simultaneous operating range indexing during installation. The tensioner comprises a stop plate and cooperating lock plate. The tensioner comprises a pivot arm having a pivot arm member that cooperatively engages a base plate member. In a first, or transit mode, the pivot arm member temporarily engages the base plate member to put a torsion spring and thereby the pivot arm in a preloaded condition. The lock plate is engaged with the stop plate. As a mounting fastener is engaged into a mounting surface the pivot arm member is automatically disengaged from the base plate member by an axial movement of the pivot arm, thereby allowing the pivot arm to rotate and thereby impart a torsion spring force to a belt, i.e., tensioning the belt in an operating position. During the initial movement the lock plate remains engaged with the stop plate thereby causing the lock plate to rotate with the pivot arm, which automatically and properly indexes the pivot arm movement travel stop members with respect to the lock plate, thereby automatically setting a working range. As the fastener is then fully torqued down, the lock plate is fully disengaged from the pivot arm and yet fixed in position to allow full operation of the pivot arm in the operating range.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 6(a) is a cross-sectional view of the tensioner described in FIG. 1 in the transit configuration.

FIG. 6(b) is a top plan view of the tensioner.

FIG. 6(c) is a side view of the tensioner.

DETAILED DESCRIPTION OF THE PREFERRED EMBODIMENT

The inventive tensioner is used on accessory belt drive systems such as those found on automotive engines. The tensioner is used to automatically load or tension a belt, thereby assuring proper power transmission from a driver pulley to a driven pulley. The belt tension, or load, is realized through application of a spring force.

The inventive tensioner comprises the inventive capability of being automatically "fired" to load a belt while simultaneously having its pivot arm travel (working) range indexed or adjusted automatically. Firing and adjustment of working range each occur as the tensioner is being bolted to a mounting surface, such as an engine.

The inventive tensioner provides a significant improvement over the prior art by reducing the number and complexity of the steps required for installation, as well as deleting an otherwise wasted part, namely, a preload pin. Furthermore the accuracy of the tension applied is no longer dependant upon the skill of the installing operator. The tensioner torsion spring is preloaded during its initial assembly in anticipation of later final assembly on an engine. The inventive tensioner can be immediately placed in its final position and torqued down during assembly on an engine. As the mounting fastener, such as a bolt, is torqued down on a mounting surface the tensioner is "fired" to load a belt. No pin is required to hold the preload and thereby need not be removed and discarded. The working range is simultaneously adjusted by rotation of the stop member with the pivot arm. Hence, the inventive tensioner is installed and adjusted in a single step.

Figure 1:
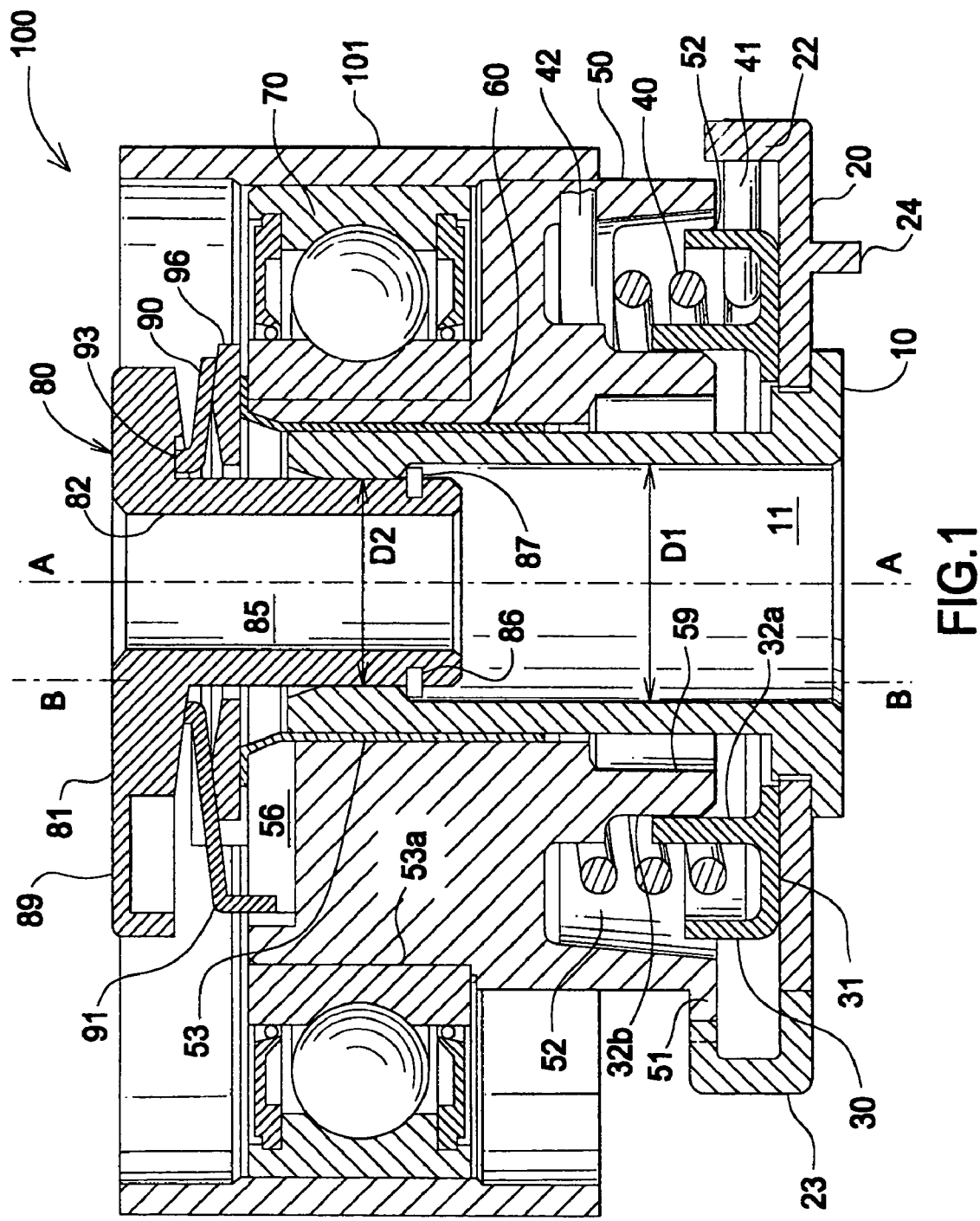
FIG. 1 is a cross-sectional view of the preferred embodiment.

FIG. 1 is a cross-sectional view of the preferred embodiment. Tensioner 100 comprises shaft 10. Shaft 10 has a substantially cylindrical form and may comprise either a metallic or plastic material known in the art, for example, steel, brass, aluminum, nylon, PTFE or their equivalents. Shaft 10 comprises a bore 11. Bore 11 is aligned with and determines a tensioner pivot arm axis of rotation A-A. Bore 11 has a first diameter D1 and a second diameter D2. Diameter D1 is greater than diameter D2.

Base plate 20 is engaged with shaft 10. Base plate 20 comprises lug 22 for engaging an end 41 of a torsion spring 40. Shaft 10 and base plate 20 may comprise a single part as well. Base plate 20 also comprises a "J" shaped member 23. In a transit mode used to transport the tensioner prior to final assembly, member 51 is aligned in a substantially coplanar manner with member 23 to temporarily hold pivot arm 50 in place to maintain a preload on torsion spring 40. Tensioner 100 is manufactured with spring 40 in a preloaded condition. Pivot arm 50 is automatically released to tension a belt during final assembly of the tensioner into a belt drive system as further described herein. Although described for ease of understanding as having a "J" shape, member 23 can comprise any form that will allow member 51 to disengage from member 23 upon axial movement of pivot arm 50.

Base plate 20 also comprises index member 24. Index member 24 cooperatively engages a receiving portion in a mounting surface, such as a recess or hole (not shown). Index member 24 and fastening member 980, see FIG. 10(a), establish a predetermined position of base plate 20 and therefore of pivot arm 50 in an operating position. In an alternate embodiment, index member 24 may comprise a slot or hole that in turn receives a cooperating protrusion from a mounting surface. Either alternate embodiment will work with equal success so long as index member 24 prevents rotation of the base plate 20 about fastener 980 during operation of the tensioner.

Torsion spring 40 has a first end 41 engaged with lug 22 and a second end 42 engaged with pivot arm 50. Torsion spring 40 applies a torque to pivot arm 50. Spring carrier member 30 receives a portion of torsion spring 40 coils. Spring carrier 30 maintains a proper torsion spring 40 position with respect to pivot arm 50. Spring carrier 30 position is located by a concentric engagement with pivot arm skirt 59. Carrier 30 frictional surface 31 base plate 20 during operation. Surface 32a has a frictional engagement with skirt surface 32b which in conjunction with surface 31 provides a means of damping oscillatory movements of pivot arm 50. The engagement between the spring carrier 30 and pivot arm skirt 59 also seals the bushing 60 and the bush area from contaminants which would otherwise shorten the operating life of the tensioner.

Pivot arm 50 is rotatably engaged with and pivots about shaft 10. Bushing 60 provides for smooth pivotal rotation of the pivot arm 50 in a manner known in the art. Bushing 60 comprises nylon, PTFE or other suitable bushing material known in the art. Bushing 60 has a coefficient of friction that serves to damp movements of pivot arm 50. The coefficient of friction is in the range of approximately 0.20 to approximately 0.40.

Shaft 10 projects through pivot arm bore 53. Pivot arm 50 pivots on shaft 10 about axis A-A. Pivot arm 50 comprises member 51 which projects radially from pivot arm 50 in a location that allows it to functionally engage member 23. Pivot arm 50 further comprises recess 52 which receives torsion spring 40.

Torsion spring 40 imparts a torque to pivot arm 50 thereby imparting a spring force to a belt during operation. An end 41 of torsion spring 40 is engaged with lug 22 on base plate 20. Another end 42 of torsion spring 40 is engaged with pivot arm 50.

Torsion spring 40 is kept in a somewhat axially compressed condition between pivot arm 50 and base plate 20 so the proper relationship of the pivot arm and base plate is maintained during installation and operation.

Bearing 70 is engaged with an outer portion 53a of pivot arm 50. Bearing 70 may comprise a ball bearing or needle bearing or any other suitable bearing known in the art. Pulley 100 is mounted on an outer race of bearing 70. Pulley 100 may comprise a flat belt bearing surface 101, or, may have a profile known in the art such as multiple-ribbed or toothed or single "V". Pulley 100 may comprise molded plastic, stamped or spun-rolled metal. Pulley 100 has an axis of rotation B-B. Axis B-B is eccentrically offset from axis A-A.

One will note form FIG. 1 that the tensioner is very compact as substantially all of the tensioner components are contained within an envelope defined by pulley surface 101, including but not limited to bearing 70, pivot arm 50, stop plate 80, lock plate 90, collar 96, spring 40, carrier 30 and shaft 10.

Stop member 80 is substantially cylindrical. It comprises flange 81 and shaft 82. Shaft 82 is concentrically engaged with shaft 10. Shaft 82 has an outside diameter that is only slightly less than diameter D2 to allow a slightly frictional fit while allowing rotation of the stop plate within the shaft 10. Circlip 87 is engaged in a groove 86.

Figure 3C:
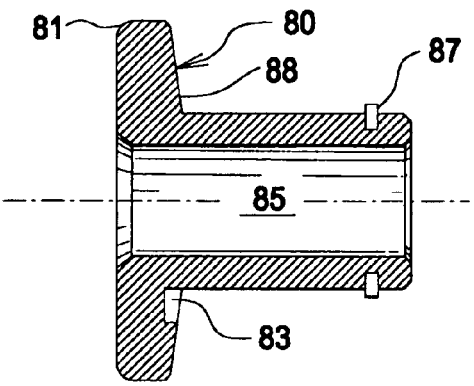
FIG. 3(c) is a side cross-sectional view of the stop plate.

During initial manufacture, shaft 82 is pressed into bore 11 until circlip 87 engages bore diameter D1. This holds stop plate 80 in proper relation to shaft 10 and pivot arm 50 during transit and prior to final installation of the tensioner on an engine. Stop plate 80 also comprises a bore 82 to accommodate fastener 980, see FIG. 10(a). Stop member 80 also comprises portion 89 which projects radially from flange 81, see FIG. 3(d). Portion 89 comprises recess 890 which receives end 91 as end 91 retracts from recess 56 during installation, see FIG. 8(a). Portion 89 engages travel stops 54, 55 to limit the range of travel of pivot arm 50, see FIG. 6(b). Please note that portion 89 is not required for proper operation of the tensioner since end 91 may engage stop member 54, 55 as well.

Lock plate 90 is engaged with stop plate 80. Lock plate 90 comprises end 91 which engages a recess 56 in pivot arm 50 during transit and prior to final assembly. Tab 93 engages lock plate 90 with stop plate 80 so that the stop plate and lock plate are held in a desired temporary relationship during transit and prior to final assembly as explained elsewhere in this specification.

Figure 5A:
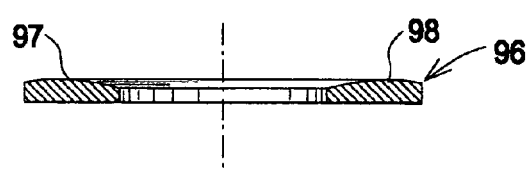
FIG. 5(a) is a cross-sectional view of a collar.

Also disposed in stacked relation with lock plate 90 on shaft 82 is collar 96. Lock plate 90 pivots on a collar surface 97, see FIG. 5(a), during final installation as described elsewhere in this specification.

Figure 2B:
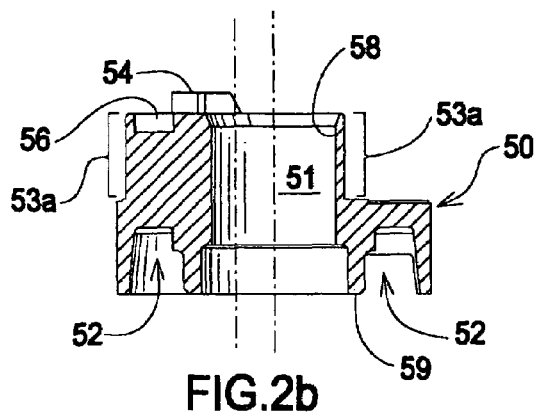
FIG. 2(b) is a side cross-sectional view of the pivot arm.
Figure 2C:
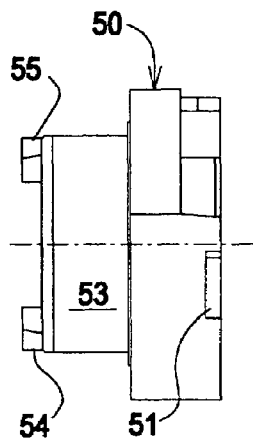
FIG. 2(c) is a side view of the pivot arm.
Figure 2A:
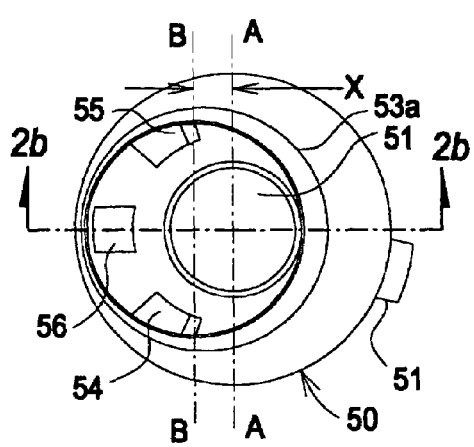
FIG. 2(a) is a top plan view of the pivot arm.

FIG. 2(a) is a top plan view of the pivot arm. Pivot arm 50 pivots about shaft 10 on axis A-A. Recess 56 on a top surface of pivot arm 50 receives end 91 of lock plate 90. Stop members 54, 55 disposed on either side of recess 56 limit pivotal movement of pivot arm 50 during tensioner operation.

Member 51 projects radially from a side of pivot arm 50. Member 51 cooperatively engages member 23 on base plate 20.

Pulley center of rotation axis B-B is eccentrically displaced a distance "X" from the axis of rotation A-A of pivot arm 50. Distance "X" is determinative of the spring force applied to a belt as pivot arm 50 is pivoted about axis A-A by torsion spring 40.

FIG. 2(b) is a side cross-sectional view of the pivot arm. Annular recess 52 receives torsion spring 40. Skirt 59 engages carrier 30 to seal the internals including bushing 60 from debris and other contaminants. Bore 51 is aligned with axis A-A. Stop members 54, 55 project from the top of pivot arm 50. Stop members 54, 55 may engage portion 89 when the tensioner is in operation, thereby establishing the working range of the tensioner pivot arm.

Lock plate 90 is used to properly align the pivot arm 50 and stop plate 80 during installation between stop members 54, 55.

Recess 56 is disposed between stop members 54, 55. In an alternate embodiment, portion 58 of pivot arm 50 can be omitted to decrease overall material required for pivot arm 50.

FIG. 2(c) is a side view of the pivot arm. Stop members 54, 55 are shown disposed on either side of recess 56. Member 51 projects from a side of pivot arm 50. Member 51 is radially disposed on pivot arm 50 for cooperative engagement with member 23.

Figure 2D:
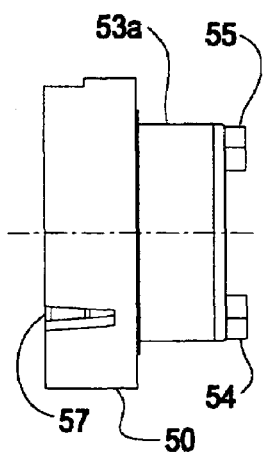
FIG. 2(d) is a side view of the pivot arm.

FIG. 2(d) is a side view of the pivot arm. Slot 57 in pivot arm 50 accommodates end 42 of torsion spring 40 (not shown). Slot 57 is somewhat elongate to accommodate axial movement of pivot arm 50 during installation and to allow spring end 42 to slide into place during initial assembly of pivot arm 50 onto shaft 10.

Figure 2E:
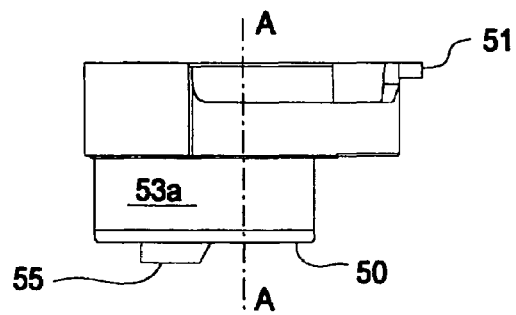
FIG. 2(e) is a side view of the pivot arm.

FIG. 2(e) is a side view of the pivot arm.

Figure 3A:
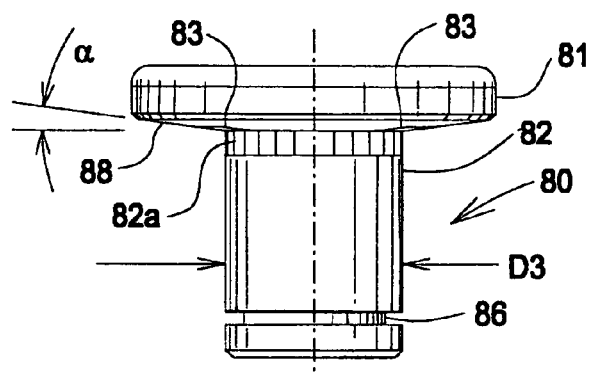
FIG. 3(a) is a side view of the stop plate.
Figure 3D:
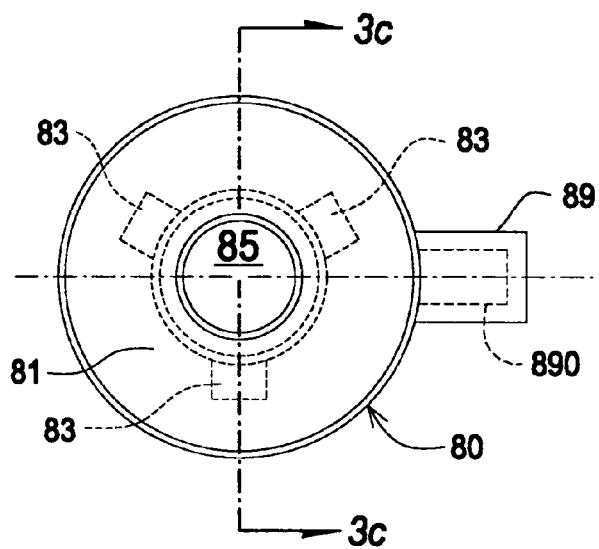
FIG. 3(d) is a top view of an alternate embodiment of the stop plate.

FIG. 3(a) is a side view of the stop plate. Stop plate 80 comprises flange 81 at one end. Groove 86 encircles the shaft 82. Circlip 87 is engaged in groove 86, see FIG. 1. Stop plate shaft 82 engages shaft 10 through bore 11. Shaft 82 has an outside diameter D3, which is slightly less than diameter D2 to create a sliding frictional fit between shaft 82 and bore 11, while minimizing free play between the two.

Surface 88 of flange 81 is disposed at an angle α with respect to a normal to axis A-A. Angle α is in the range of approximately +0° to approximately 5°. Angle α is approximately 2° in the preferred embodiment. The angular disposition of surface 88 allows lock plate 90 and end 91 to pivot during installation of the tensioner as explained elsewhere in this specification. Surface 82a of shaft 82 may be splined or stepped to give a fit sufficient to prevent the lock plate 90 from over-rotating when pivot arm 50 rotates in response to movement of pivot arm 50 as bolt 980 is torqued into place.

Figure 3B:
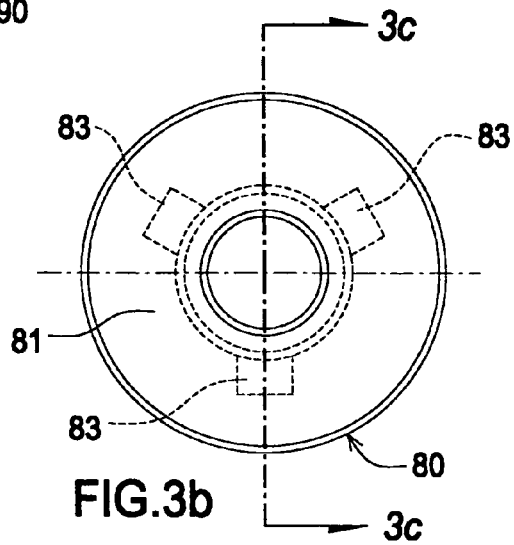
FIG. 3(b) is a top plan view of the stop plate.
Figure 4A:
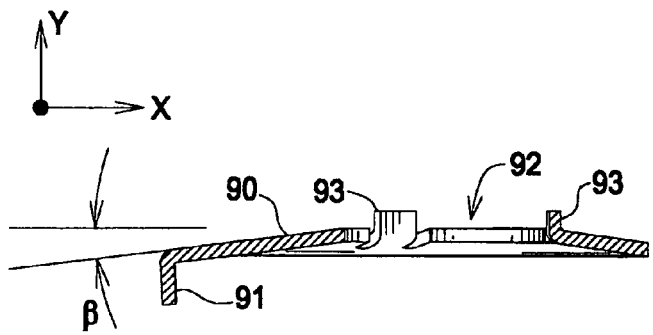
FIG. 4(a) is a side cross-sectional view of the lock plate.

FIG. 3(b) is a top plan view of the stop plate. Recesses 83 are disposed about bore 85 on underside surface 88 of flange 81. Recesses 83 receive tabs 93 on lock plate 90, see FIG. 4(a), thereby engaging the lock plate with the stop plate.

FIG. 3(c) is a side cross-sectional view of the stop plate. Circlip 87 is disposed in groove 86 in shaft 82. Circlip 87 is known in the art. Circlip 87 only need be compressible in groove 86 so that it can pass down bore D2 without unreasonable force. Then, when it gets to bore D1 circlip 87 pops out to its unconstrained diameter—which is less than D1 but sufficiently more than D2 to hold the assembly together under the axial spring load. For the purposes of this portion of the specification, the assembly comprises stop plate 80, lock plate 90, collar 96, bushing 60, pivot arm 50 and shaft 10. Bore 85 receives a fastener such as a bolt (980) for attaching the tensioner to a mounting surface such as an engine or engine module. See bolt 980 in FIG. 6(*a*).

FIG. 3(*d*) is a top view of an alternate embodiment of the stop plate. Portion 89 projects radially from flange 81 a distance sufficient to allow stop members 54, 55 to engage portion 89 during tensioner operation. During installation end 91 retracts into recess 890 of portion 89, see FIG. 1. However, it is not necessary that portion 89 be aligned with end 91. End 91 may be angularly displaced from portion 89, so long as portion 89 is properly aligned between stop members 54, 55 once the tensioner is fully installed and ready for operation.

Figure 4B:
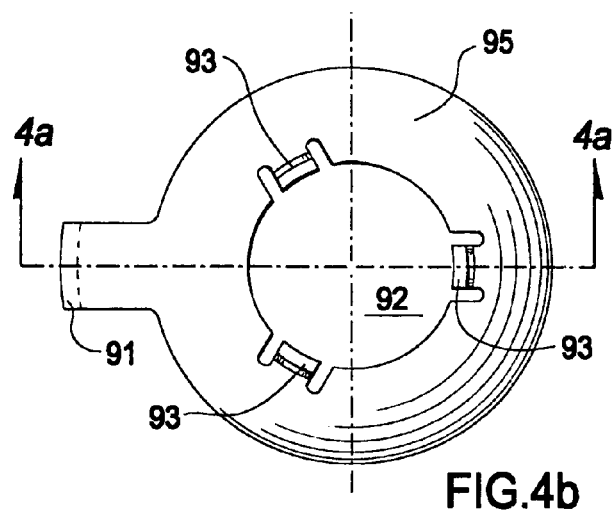
FIG. 4(b) is a plan view of the lock plate.

FIG. 4(*a*) is a side cross-sectional view of the lock plate. Lock plate 90 comprises end 91 which projects radially. End 91 cooperatively engages recess 56. Tabs 93 extend from lock plate 90 in such a way so as to allow at least one tab 93 to engage a recess 83.

End 91 is disposed at an angle β which allows end 91 to project downward into recess 56. Angle β is in the range of approximately +0° to approximately 5°. Angle β is approximately 2° in the preferred embodiment.

FIG. 4(*b*) is a plan view of the lock plate. Tabs 93 are shown disposed about bore 92. Tabs 93 extend in an axial direction. At least one tab 93 engages a stop plate recess 83. However, even though tabs 93 are shown symmetrically disposed about lock plate 90, this is not meant to be limiting since it is only necessary that at least one tab 93 engage one recess 83. The engagement causes lock plate 90 to rotate or pivot stop plate 80 when pivot arm 50 is as the tensioner is "fired" during installation, see FIG. 6.

Body portion 95 of lock plate 90 comprises and functions substantially as a Belleville spring. Belleville springs are generally known in the art. A force applied axially to tabs 93 by stop plate 80 as fastener 980 is torqued compresses body 95 in a predictable manner causing end 91 to pivot away from and out of recess 56 as body 95 pivots upon collar 96. In this example, if a force vector is axially applied in the −y direction to tabs 93, then end 91 will pivot in direction +y. This movement is characteristic of a Belleville spring in axial compression.

Figure 5B:
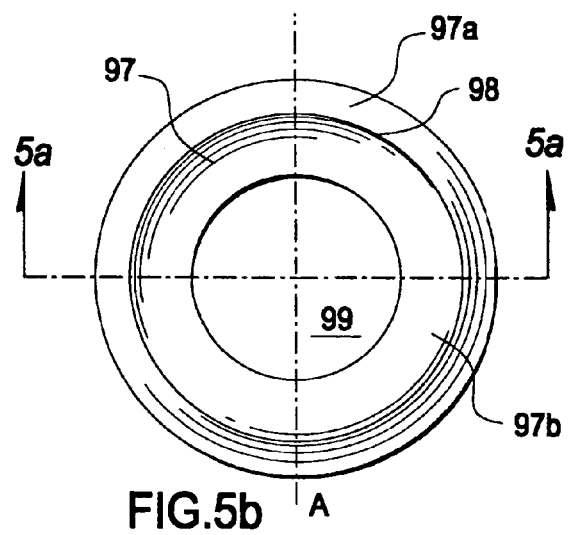
FIG. 5(b) is a plan view of the collar.

FIG. 5(*a*) is a cross-sectional view of a collar. Collar 96 is disposed between lock plate 90 and pivot arm 50 about shaft 10. Collar 96 comprises surface 97 upon which lock plate body 95 bears.

In the uncompressed state lock plate body 95 bears upon radially outer surface 97(*a*) due to the characteristic partial conical form of an uncompressed Belleville spring as shown in FIG. 4(*a*). As lock plate 90 is compressed by stop plate 80 during installation stop plate 80 moves in an axial direction toward base plate 20 while pressing upon pivot arm 50. In so moving, collar 96 presses pivot arm 50 in an axial direction as well. As lock plate 90 is then further moved collar 96 comes to bear upon shaft 10. Lock plate body 95 then circumferentially pivots or flexes on ridge 98 until body 95 is substantially fully clamped between radially inner surface 97(*b*) and stop plate surface 88. As body 95 is compressed into engagement with surface 97(*b*), end 91 pivots in a direction opposite the applied compressive force. This results in end 91 fully retracting from recess 56 as fastener 980 is fully torqued down, see FIG. 12(*a*).

FIG. 5(*b*) is a plan view of the collar. Bore 99 is disposed to align collar 96 with shaft 82. Ridge 98 is disposed between radially outer surface 97(*a*) and racially inner surface 97(*b*). Collar 98 may comprise either a plastic or metallic material.

FIG. 6(*a*) is a cross-sectional view of the tensioner described in FIG. 1 in the transit configuration. FIGS. 6(*a*), 6(*b*), and 6(*c*) are different views depicting the tensioner in transit mode. "Transit mode" refers to the tensioner as initially manufactured with a preloaded spring, but prior to final assembly of the tensioner in a belt drive system on a mounting surface such as an engine.

Lock plate 90 is shown with end 91 engaged with recess 56. In this "preloaded" configuration member 51 is cooperatively aligned in a coplanar manner with and engaged with member 23, see FIG. 6(*c*). Torsion spring 40, and thereby the pivot arm, is preloaded, that is, the pivot arm has been rotated a predetermined amount to cause the torsion spring to exert a spring force on the pivot arm. In this mode pivot arm 50 is axially disposed a predetermined distance (X1) from base plate 20. Torsion spring 40 is somewhat axially compressed to maintain this configuration. Fastener 980 is frictionally engaged with stop plate bore 85 sufficient to allow the fastener to be transported with the tensioner. Fastener 980 may comprise a threaded bolt or a press fit stud.

FIG. 6(*b*) is a top plan view of a tensioner. End 91 is engaged in recess 56.

In the "transit mode" configuration lock plate 90 is not compressed and end 91 is not retracted from recess 56. Torsion spring 40 presses pivot arm 50 into light contact with collar 96. Collar 96 is pressed into light contact with lock plate 90, which in turn is pressed into light contact with flange 81. Stop plate 80 is held in proper relation to shaft 10 by the interference fit between circlip 87 and diameter D2. Torsion spring 40 is torsionally preloaded as well between pivot arm 50 and base plate 20.

FIG. 6(*c*) is a side view of the tensioner. Member 51 is aligned with member 23, thereby holding pivot arm 50 in the preloaded condition. Gap "X1" is maintained by the axial force exerted by the torsion spring upon pivot arm 50.

Figure 7A:
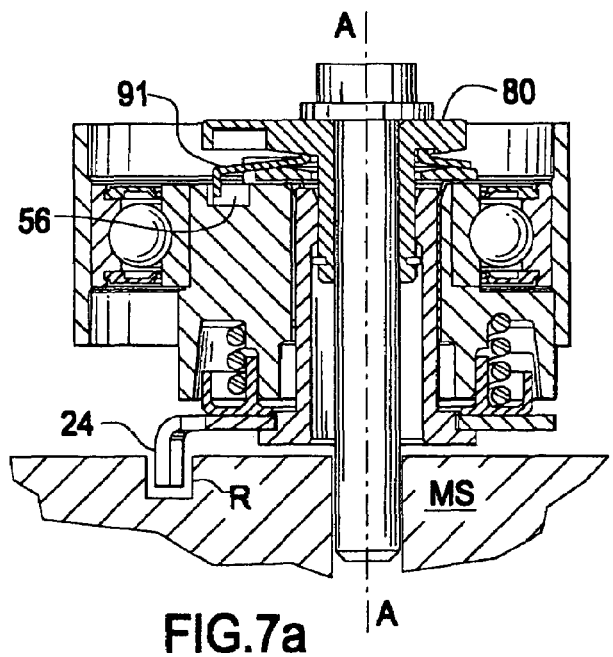
FIG. 7(a) is a cross-sectional view of the tensioner described in FIG. 1 in the fired configuration.
Figure 7B:
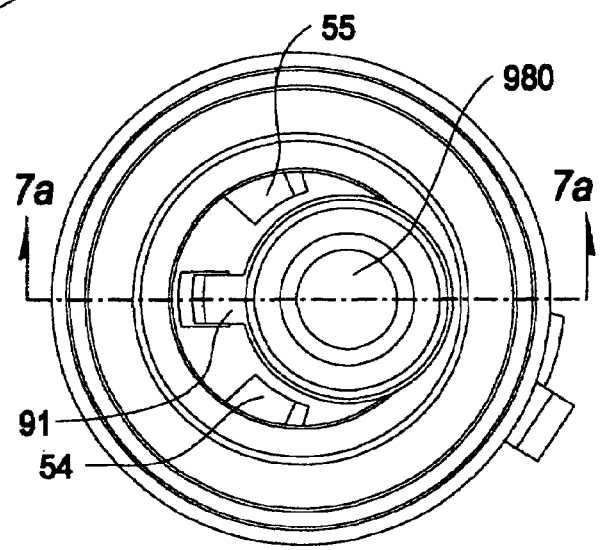
FIG. 7(b) is a top plan view of the tensioner.
Figure 7C:
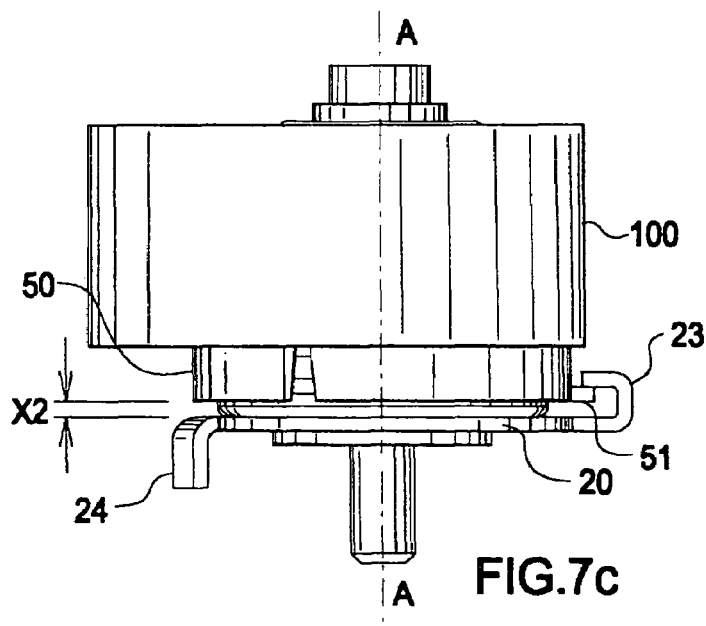
FIG. 7(c) is a side view of the tensioner.

FIG. 7 (*a*) is a cross-sectional view of the tensioner described in FIG. 1 in the fired configuration. Bolt 980 has been partially screwed into a mounting surface, such as an engine block (MS), but it is not yet fully torqued down. As bolt 980 is screwed in, stop plate 80 bears upon lock plate 90 which in turn bears upon collar 96. Collar 96 presses pivot arm 50 axially against torsion spring 40, thereby moving pivot arm 50 axially as well, which in turn decreases the distance (X2) between pivot arm 50 and base plate 20, see FIG. 7(*c*). As pivot arm 50 moves axially member 51 disengages from its coplanar relationship with member 23, see FIG. 7(*c*), thereby "firing" the tensioner. Preloaded torsion spring 40 rotates pivot arm 50 into contact with a belt (not shown) putting pivot arm 50 into an operating position. However, since end 91 is not fully disengaged from recess 56, as pivot arm 50 rotates end 91 causes stop plate 80 to rotate as well. This sequence of events automatically indexes portion 89 between the stop members 54, 55 to set a working range, as well as automatically brings pivot arm 50 and pulley 100 into contact with a belt to impart a belt load, namely, an operating position.

FIG. 7(*b*) is a plan view of the tensioner. End 91 is engaged with recess 56. When the tensioner "fires" or loads the belt, pivot arm 50 rotates under influence of spring 40. Since in this state end 91 is still engaged with pivot arm 50, end 91 rotates with pivot arm 50, thereby holding the proper relationship between members 54, 55 and portion 89, automatically setting an pivot arm working range.

FIG. 7(*c*) is a side view of the tensioner. Gap (X2) is less than (X1) in FIG. 6(*c*) by virtue of the axial movement of pivot arm 50. Member 51 is disengaged from member 23.

Figure 8A:
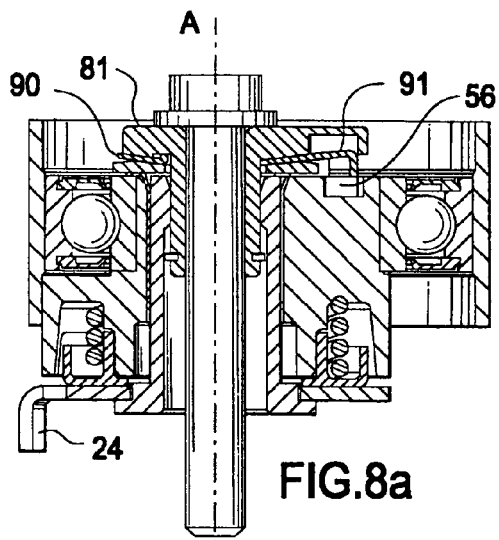
FIG. 8(a) is a cross-sectional view of the tensioner described in FIG. 1 in the unlocked and operational configuration.

FIG. 8(a) is a cross-sectional view of the tensioner described in FIG. 1 in the fully operational configuration. Bolt 980 is fully torqued down in the mounting surface. Flange 81 bears fully upon an end of shaft 10 through collar 96 and lock plate 90. By virtue of the engagement between collar 96 and lock plate 90, pivot arm 50 is pressed toward base plate 20 against an axial spring force exerted by torsion spring 40. In this configuration, flange surface 88 is fully engaged with body 95, which in turn is fully engaged with collar surface 97(b). Distance (X3) is less than distance (X2) to assure that no contact occurs between member 51 and member 23 during operation of the tensioner, see FIG. 8(c).

End 91 of lock plate 90 is shown fully retracted from recess 56. As such it is substantially disposed within recess 890. Lock plate 90 has pivoted upon ridge 98 of collar 96 as lock plate 90 was compressed between stop plate flange 88 and collar 96. In the fully installed state pivot arm 50 may now rotate freely about axis A-A. In the fully withdrawn position for end 91 shown in FIG. 8(a), portion 89 limits rotational movement of pivot arm 50 between stop members 54, 55, see FIG. 8(b). Member 24 is engaged with a recess (R) in mounting surface (MS).

Automatic adjustment of the working range in this manner allows the tensioner to be fully adjustable to suit each operation location, regardless of variations between the mounting location and belt position caused by manufacturing tolerances. It also allows the tensioner to be installed and automatically operationally configured on an engine in a single step without any waste parts, namely, member 51 and member 23 perform the function formerly performed by the disposable preload pin in the prior art.

Figure 8B:
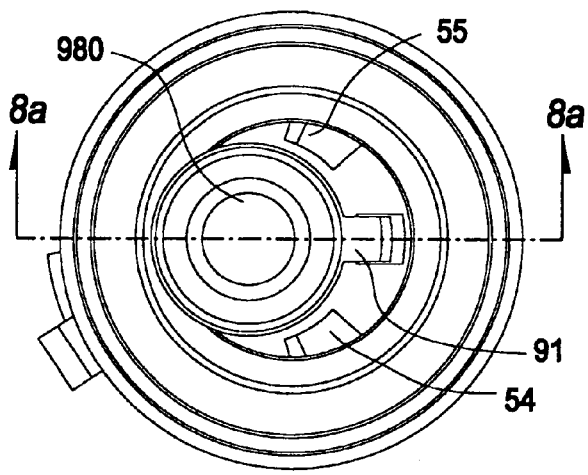
FIG. 8(b) is a plan view of the tensioner.

FIG. 8(b) is a plan view of the tensioner. End 91 is retracted from recess 56, disposed between members 54, 55. Once fastener 980 is fully torqued down end 91 is fixed in place by virtue of the clamping force developed between stop plate flange 88 and shaft 10. During installation the tensioner should be engaged with a belt in a slack condition on the pulley 100 before the tensioner is put into operational mode as shown and described in FIG. 8(c).

Figure 8C:
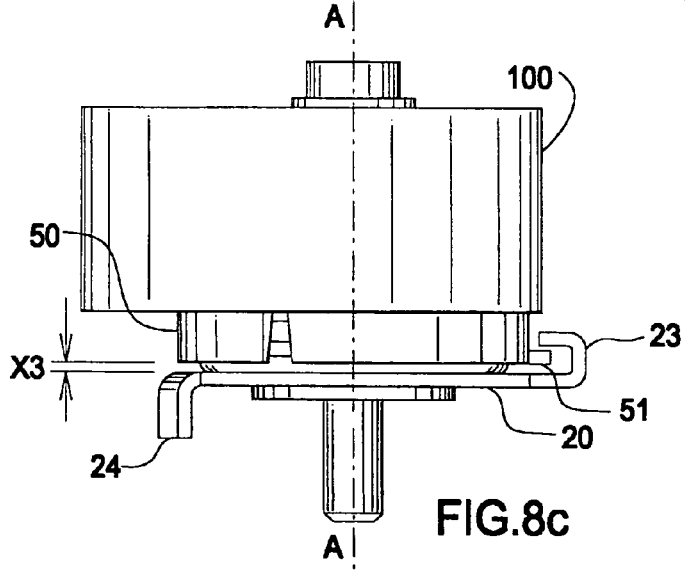
FIG. 8(c) is a side view of the tensioner.

FIG. 8(c) is a side view of the tensioner. Gap (X3) is less than gap (X2). Member 51 is fully disengaged from member 23. Pivot arm 50 is fully operational in this configuration and freely pivots between stop members 54, 55.

Hence, the sequence is generally, first, the tensioner is loosely installed using a fastener on a mounting surface in the "transit" mode. A belt is placed in the belt drive and on the pulley in a slack condition. Next, the fastener is further screwed into the mounting surface which causes the pivot arm to move axially toward the mounting surface thereby automatically releasing or "firing" the pivot arm to load a belt. As the pivot arm is "fired" the lock plate moves the stop plate with the pivot arm to an operating position. Next, the fastener is fully torqued down, which disengages the lock plate from the pivot arm, thereby automatically setting the pivot arm operating range by disposing the stop plate portion 89 between stop members 54, 55 on the pivot arm.

Figure 9:
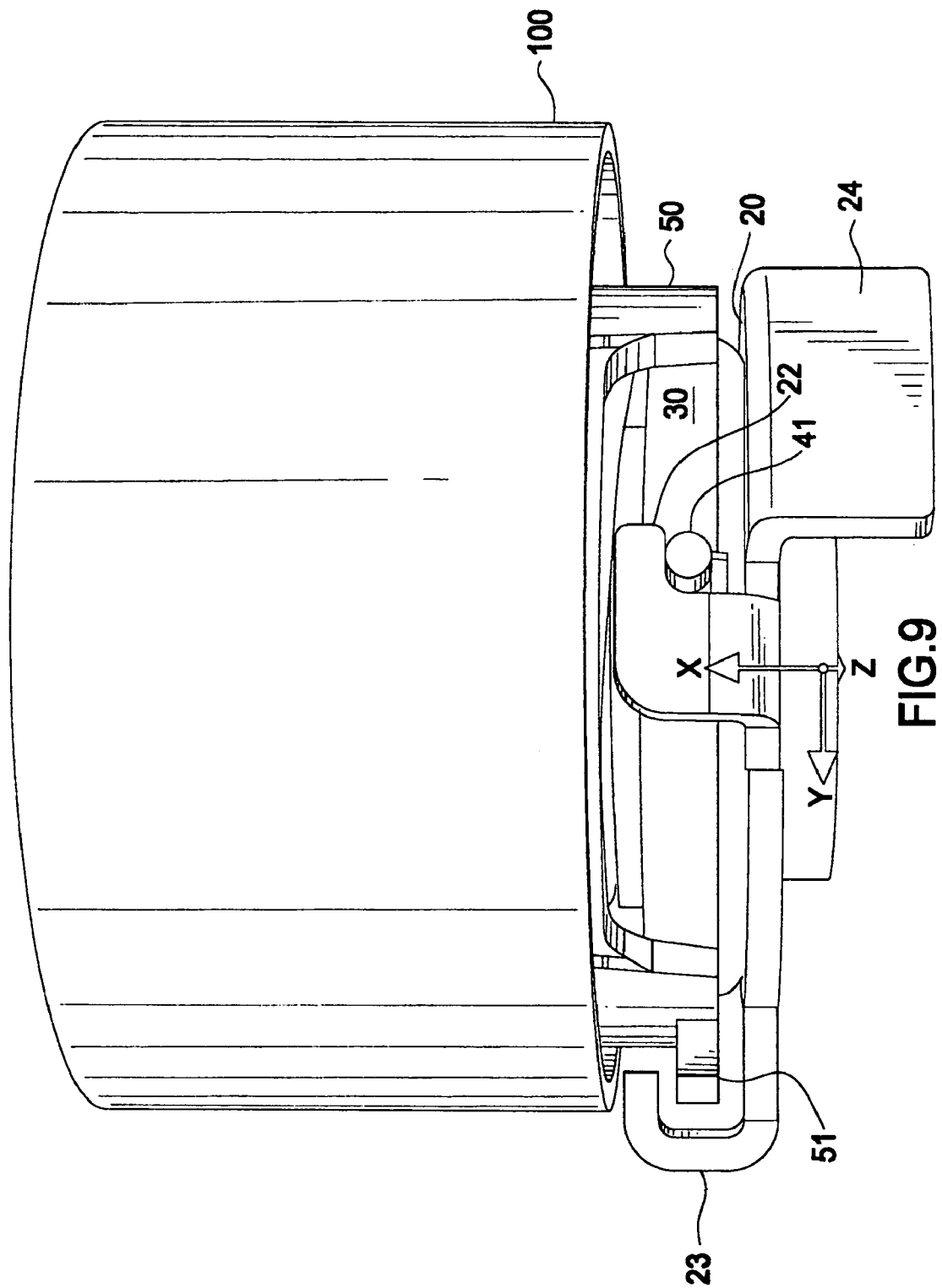
FIG. 9 is a side view detail of the tensioner.

FIG. 9 is a side view detail. End 41 of spring 40 is shown engaged with lug 22. Member 51 is shown in the installed position with respect to member 23, namely, member 51 is fully disengaged from member 23 thereby freeing pivot arm 50 to rotate whereby spring 40 imparts a force to a belt.

Although forms of the invention have been described herein, it will be obvious to those skilled in the art that variations may be made in the construction and relation of parts without departing from the spirit and scope of the invention described herein.

We claim:

1. An eccentric pivot arm tensioner comprising:
   a pivot arm having at least one travel stop and a pulley rotationally disposed on the pivot arm;
   the pivot arm pivotally engaged with a base;
   the base comprising an index member, the index member engagable with a cooperating feature on a mounting surface;
   a torsion spring disposed between the pivot arm and the base, the torsion spring imparting a spring force to the pivot arm;
   a first member disposed on the pivot arm;
   a second member disposed on the base, the second member cooperatively engagable with the first member whereby the torsion spring is held in a temporarily preloaded condition;
   a lock member temporarily engaged with the pivot arm, the lock member being rotatable by a movement of the pivot arm and disengagable from the pivot arm;
   a stop member engaged with the lock member, the stop member rotatable by the lock member during installation of the tensioner such that the stop member is disposed in a predetermined position with respect to the travel stop once the pivot arm has reached an operating position; and
   the stop member axially moveable whereby an initial axial movement of the stop member releases the first member from the second member thereby releasing the pivot arm to rotate, and upon a further axial movement of the stop member disengaging the lock member from the pivot arm.

2. The eccentric pivot arm tensioner as in claim 1, wherein the stop member further comprises a bore for receiving a fastener.

3. The eccentric pivot arm tensioner as in claim 2 further comprising:
   a carrier member for receiving a torsion spring coil;
   the carrier member having a frictional surface which engages a surface on the base, and having a frictional engagement with the pivot arm to damp an oscillatory movement of the pivot arm.

4. The eccentric pivot arm tensioner as in claim 2 further comprising;
   a collar member disposed between the lock member and the pivot arm, the collar having a contour which causes the lock member to flex upon axial movement of the lock member during installation of the tensioner and thereby disengage the lock member from the pivot arm.

5. The tensioner as in claim 1 wherein the lock member comprises a Belleville spring.

* * * * *

UNITED STATES PATENT AND TRADEMARK OFFICE
CERTIFICATE OF CORRECTION

PATENT NO.       : 7,637,829 B2                                    Page 1 of 1
APPLICATION NO.  : 10/953910
DATED            : December 29, 2009
INVENTOR(S)      : Stone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1059 days.

Signed and Sealed this

Ninth Day of November, 2010

David J. Kappos
*Director of the United States Patent and Trademark Office*